April 12, 1960
F. C. BINTER
2,932,364
METHOD FOR TREATMENT OF EXHAUST GASES
FROM INTERNAL COMBUSTION ENGINES
Filed Aug. 15, 1957
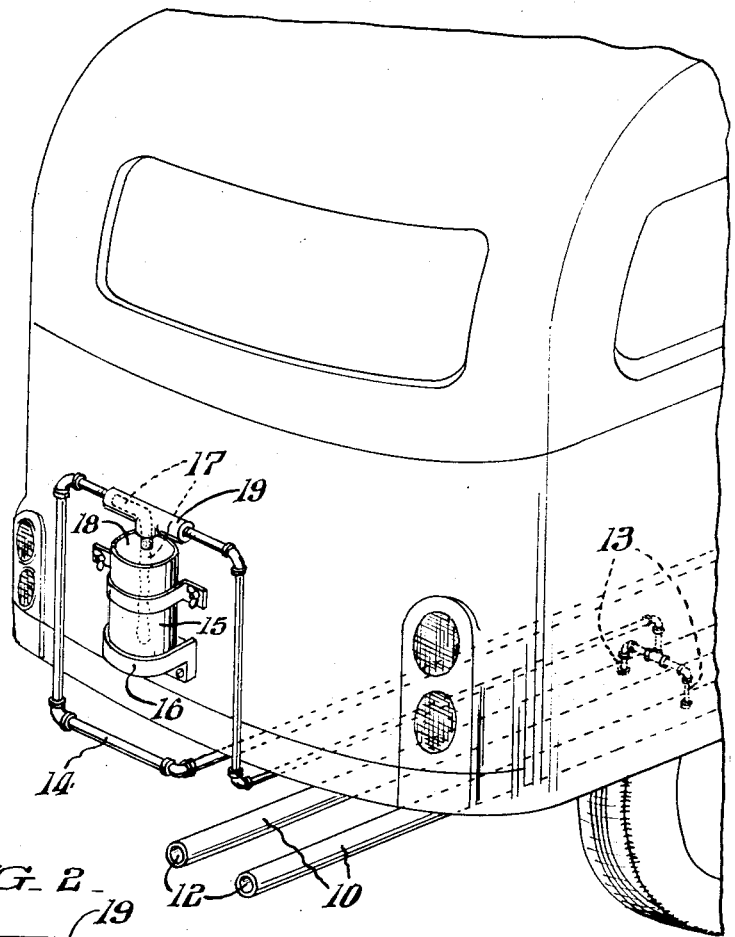
FIG_1_
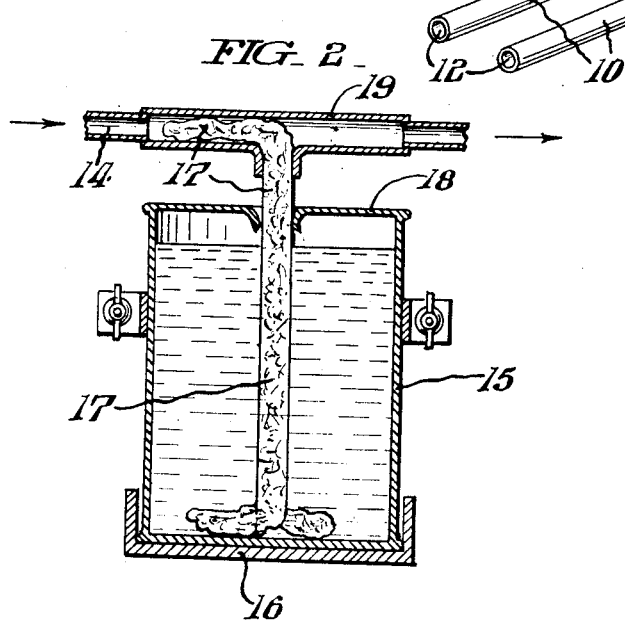
FIG_2_
INVENTOR.
*Frederick C. Binter,*
BY
*Paul & Paul*
ATTORNEYS.

United States Patent Office

2,932,364
Patented Apr. 12, 1960

2,932,364

METHOD FOR TREATMENT OF EXHAUST GASES FROM INTERNAL COMBUSTION ENGINES

Frederick C. Binter, Moorestown, N.J.

Application August 15, 1957, Serial No. 678,420

10 Claims. (Cl. 183—115)

This invention relates to a method for treating exhaust gases from internal combustion engines, and more particularly relates to a method of purifying the exhaust from a diesel or gasoline engine, thereby eliminating or drastically reducing objectionable odors and irritating substances.

One of the problems which has followed in the wake of our motorized civilization is the accumulation of exhaust gases from the many motor powered vehicles using our highways and streets. On the open highway this is, generally speaking, merely an annoyance, but in urban and city streets these accumulations of exhaust gases can become quite objectionable, reaching a maximum in the heavily travelled streets of the downtown business areas of cities where tall buildings on both sides of narrow streets create canyons in which the gases accumulate to a degree where they become a matter of serious complaint.

This condition has become much worse in the last decade because of the increasing usage of diesel engines (instead of gasoline engines) to propel trucks and omnibuses. The fuel used by diesel engines is much heavier than gasoline, and the combustion products are only objectionable in smell, but are very irritating to the eyes. In a number of our cities, the use of diesel operated omnibuses in downtown business areas has caused so much complaint that it has become imperative to take steps to eliminate the odor and the eye-irritating properties of the exhaust gases, or discontinue entirely the operation of omnibuses in these locations. Much work has been done in the past to eliminate odors from exhaust gases from internal combustion engines by passing these gases through chambers filled with catalysts. These methods are effective to some extent in denaturing the exhaust gases from internal combustion engines, but they suffer from a number of drawbacks. The catalyst is itself expensive, and must be contained in a stainless steel container which is costly. The catalyst is subject to "poisoning" and requires frequent regeneration. As a practical matter, a simpler, more reliable and less costly method of denaturing these exhaust gases is required.

It is accordingly an object of this invention to provide a method of eliminating the nuisance and hazard created by objectionable substances in the exhaust gases of internal combustion engines, which method is inexpensive, does not require excessive maintenance and does not use materials requiring regeneration. A further object is to provide a much simpler, more reliable and less costly method of denaturing exhaust gases than those which are presently available. Other objects and advantages of this invention will further become apparent hereinafter.

I have found that it is possible to remove the offensive odor and the eye-irritating properties of exhaust gases from internal combustion engines, and particularly the exhaust gases from diesel engines, by injecting into the exhaust pipe a chemical composition or a mixture of the specific nature to be described hereinafter. These compositions are liquids or solids that are soluble in an aqueous medium, and are injected into the exhaust pipe of the engine, preferably as far from the outlet end of the pipe as possible, by a mechanical device comprising a container for the chemical, a suitable means for metering the chemical material into the exhaust pipe, and an appropriate filling device for replenishing the chemical material as it becomes exhausted. The exact nature of the mechanical device used to supply the chemical treatment to the exhaust system is subject to wide variations, and many suitable ways will suggest themselves to one skilled in the mechanical art.

Of the drawings:

Fig. 1 is a schematic view of an apparatus mounted on a bus, illustrating one form in which the invention may be practiced, and Fig. 2 is a sectional view taken through a dispensing tank shown in Fig. 1.

The drawings disclose schematically a preferred form of apparatus for injecting the treating chemical or chemical combination into the exhaust of a diesel powered bus, for example. The apparatus has been shown in a position outside the bus, for convenience of illustration, but it will be appreciated that this apparatus is normally housed within the engine space of the bus. Referring particularly to the drawing, it will be observed that the exhaust pipes 10, 10 of the bus which extend from the engine have open ends 12, 12 which are spaced at a considerable distance from the engine. The treating chemicals are introduced through pipes 13, 13 at a location which is spaced much nearer the engine than the open ends 12, 12 of the exhaust pipes. Preferably, the feed pipes 13, 13 are connected into the exhaust pipes 10, 10 as far from the open ends 12, 12 as is possible.

The number 14 designates a pipe for air under pressure, such air being obtainable from the air supply for air brakes, for example. The number 15 designates a tank which is mounted on a stand 16, such tank containing the chemical substance in liquid form. A wick 17 extends through a hole in the cover 18 of the tank, and extends downwardly into the liquid, such wick absorbing the liquid or aqueous solution, by capillary action. The upper end of the wick 17 is in a tube 19, to which the air line 14 is connected. The air which flows across the wick absorbs some of the liquid and injects it into the engine exhaust pipes through the feed pipes 13, 13.

In this manner, a continuous flow of the treating chemicals is intimately admixed with the exhaust from the engine, and as the mixture flows from the feed point to the open ends of the exhaust pipes, the turbulence inherent in the gas flow causes a complete mixing of the ingredients of the mix, thereby providing optimum conditions under which the treating chemical removes or converts the noxious or annoying substances in the exhaust gas, in order to produce a product emanating from the free ends 12, 12 which is neither obnoxious to the sense of smell nor irritating to the eyes.

The chemical compositions for denaturing exhaust gases from internal combustion engines are quaternary compounds, derivatives of ammonium salts, such as (but not necessarily limited to) tetramethylammonium salts including tetramethyl ammonium bromide, chloride, iodide, sulphate, etc., similar compounds wherein one of the methyl groups is replaced by a long fatty chain (such as lauryl or octyl) to produce surface active quaternary compounds; derivatives of trimethylamine such as cetyltrimethylammonium chloride; and pyridinium salts, such as the tetradecylpyridinium halides including the fluoride, chloride, bromide and iodide, etc. Any compatible quaternary ammonium salt of an acid which is soluble in water functions well in accordance with this invention. Preferably, a suitable emulsifier, an inhibitor to prevent corroding of ferrous metal containers, and a perfume oil to impart a pleasant odor are added. Water is an essential ingredient. The elimination of the offensive odors and the eye-irritating factors in the exhaust gases is accomplished only when the aforementioned quaternary ammonium salts are in an aqueous solution. When the exhaust gases were passed through a dry mixture or an organic solvent solution or emulsion of the chemicals, no effect was observed.

The function of the perfume is to impart a pleasant odor to the exhaust gases after treatment. The treatment has been found to be effective even in the absence of perfume, but the deliberate imparting of a pleasant odor is preferred.

The most effective quaternary salts in accordance with this invention are represented by the following generic formulas:

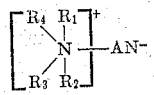

where $R_1$ and $R_2$ are methyl or ethyl groups, $R_3$ is methyl, ethyl or benzyl, and $R_4$ is a substituent containing at least 6, preferably at least 12 carbon atoms. The anion AN may be chloride, iodide, sulphate, phosphate or other inorganic radical forming an anion producing a water soluble salt.

Also useful are such quaternary compounds as:

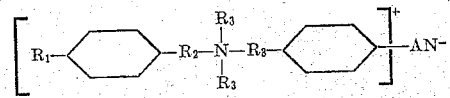

where $R_1$ is a branched chain hydrocarbon of at least 2 methyl groups, $R_2$ is an ethoxy or a methoxy (poly ether) chain of at least one oxygen and two methyl groups, $R_3$ is either a methyl or an ethyl group or a branched chain hydrocarbon of at least two methyl groups, and AN is an anion such as chloride, bromide, sulfate, phosphate, etc.

Also useful in accordance with this invention are compounds such as:

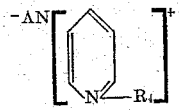

where $R_4$ is a substituted aliphatic chain containing at least 12 carbon atoms and AN an anion such as chloride, sulphate, bromide, etc.

Also useful are a wide variety of quaternary ammonium compounds manufactured from quinoline, isoquinoline, morpholine, tetrazole, and other nitrogen-containing groups.

As examples of the commoner pentavalent quaternary compounds, the following were tested on actual diesel powered buses with excellent results:

Lauryldimethylbenzylammonium chloride
Alkyldimethylbenzylammonium chloride, wherein the alkyl group contains from about 6 to about 20 carbon atoms
Alkyldimethyl 3:4 dichlorobenzylammonium chloride
Alkylarylpyridinium chloride
Di-isobutylphenoxyethoxyethyldimethylbenzylammonium chloride
Cetyldimethylbenzylammonium chloride
Cetylpyridinium chloride
Octadecenyldimethylbenzylammonium bromide
Trialkylbenzylammonium fluoride
Diisobutylcresoxyethoxyethyldimethylbenzylammonium chloride
Dodecyldimethylamine oxide
N-(higher acyl esters of colaminoformylmethyl) pyridinium chloride
Cetylpyridinium chloride
Cetylpyridinium bromide
Laurylisoquinolinium bromide
Cetyltrimethylammonium bromide
Octylphenoxyethoxyethyldimethyl p-chlorobenzylammonium chloride
Alkylhydroxybenzyldiethylammonium phosphate
Stearyldimethylbenzylammonium chloride
Stearyltrimethylammonium bromide Related and analogous compounds (other than quaternary compounds) were tested and were found to be much less effective than those cited above, or completely ineffective. These are primary and secondary amine salts, inorganic ammonium salts, aldehydes, alkylamines, hydrazones, cyanogen compounds, aliphatic nitro compounds, aromatic aldehydes, naphthylamines, etc.

The perfume constituent of the formulation may consist of any suitable natural or synthetic perfume oil, such as pine needle oil, grape oil, etc., and its choice hinges more on its volatility and on the particular odor desired than on the composition of the perfume itself.

An emulsifier of the type including the alkyl poly ether alcohols, or alkyl aryl poly ether alcohols (alkylphenoxy poly ether ethanols, or anionic, cationic and nonionic surface active agents suitable for wetting out and/or emulsification) have been found to be particularly effective and are desirably but not necessarily included in accordance with this invention.

As an inhibitor against corrosion of iron containers, it is preferred to add either a small percentage of chromate salt, ammonia or any other suitable compatible inhibitor.

Typical of effective compositions are as follows:

Example 1

| | Parts by weight |
|---|---|
| Tetradecylpyridinium bromide | 50 |
| Perfume oil | 10 |
| Non-ionic emulsifier | 5 |
| Inhibitor | .1 |
| Water | 35 |

Example 2

| | Parts by weight | | | | | |
|---|---|---|---|---|---|---|
| Tri alkyl benzyl ammonium chloride | 2 | 5 | 10 | 25 | 40 | 50 | 60 |
| Water | 50 | 70 | 60 | 60 | 65 | 55 | 50 |
| Perfume oil | 20 | 25 | 30 | 20 | 30 | 25 | 25 |
| Emulsifier | 5 | 10 | 20 | 15 | 8 | 18 | 7 |
| Inhibitor | .1 | .6 | .3 | .9 | 1.0 | .2 | .4 |

Example 3

| | Parts by weight | | | | | |
|---|---|---|---|---|---|---|
| Ethyl dimethyl benzylammonium chloride | 5 | 10 | 20 | 30 | 40 | 50 |
| Water | 50 | 60 | 80 | 55 | 45 | 35 |
| Perfume oil | 30 | 20 | | 10 | 10 | 10 |
| Emulsifier | 15 | 10 | | 5 | 5 | 5 |
| Inhibitor | .1 | .2 | .2 | .4 | .6 | 1.0 |

Example 4

| | Parts by weight | | | | | |
|---|---|---|---|---|---|---|
| Ethyldimethyl 3:4 dichlorobenzylammonium chloride | 10 | 10 | 10 | 20 | 20 | 30 |
| Water | 85 | 75 | 55 | 75 | 60 | 45 |
| Perfume oil | 5 | 15 | 25 | 5 | 15 | 15 |
| Emulsifier | | 5 | 10 | | 5 | 10 |
| Inhibitor | .1 | .1 | .1 | .2 | .2 | .2 |

Example 5

| | Parts by weight | | | | |
|---|---|---|---|---|---|
| Di-isobutylphenoxyethoxyethyldimethylbenzylammonium chloride | 10 | 10 | 20 | 20 | 30 |
| Water | 45 | 75 | 35 | 65 | 40 |
| Perfume oil | 30 | 10 | 30 | 10 | 20 |
| Emulsifier | 15 | 5 | 15 | 5 | 10 |
| Inhibitor | .1 | .1 | .2 | .2 | .6 |

Example 6

| | Parts by weight | | | | |
|---|---|---|---|---|---|
| Cetyl pyridinium chloride | 2 | 8 | 10 | 30 | 50 |
| Water | 68 | 62 | 60 | 40 | 20 |
| Perfume oil | 20 | 20 | 20 | 20 | 20 |
| Emulsifier | 10 | 10 | 10 | 10 | 10 |
| Inhibitor | .1 | .1 | .1 | .4 | .8 |

Example 7

| | Parts by weight | | | | |
|---|---|---|---|---|---|
| Lauryl isoquinolinium bromide | 2 | 4 | 8 | 10 | 30 |
| Water | 83 | 81 | 77 | 75 | 25 |
| Perfume oil | 10 | 10 | 10 | 10 | 30 |
| Emulsifier | 5 | 5 | 5 | 5 | 15 |
| Inhibitor | .1 | .1 | .1 | .1 | .6 |

Example 8

| | Parts by weight | | | |
|---|---|---|---|---|
| Octylphenoxyethoxyethyldimethyl p-chlorobenzyl-ammonium chloride | 10 | 20 | 30 | 40 |
| Water | 60 | 50 | 40 | 30 |
| Perfume oil | 20 | 20 | 20 | 20 |
| Emulsifier | 10 | 10 | 10 | 10 |
| Inhibitor | .1 | .2 | .3 | .6 |

Example 9

| | Parts by weight | | | |
|---|---|---|---|---|
| Stearyldimethylbenzylammonium chloride | 4 | 8 | 12 | 20 |
| Water | 71 | 67 | 63 | 55 |
| Perfume oil | 15 | 15 | 15 | 15 |
| Emulsifier | 10 | 10 | 10 | 10 |
| Inhibitor | .1 | .1 | .2 | .4 |

Example 10

| | Gms. |
|---|---|
| Water plus 20% ethyldimethylbenzylamine chloride by wt | 849 |
| Perfume oil—sassafras | 100 |
| Emulsifier—non-ionic | 50 |
| Inhibitor—sodium nitrite | 1 |

Example 11

Thirteen buses in the city of Philadelphia were operated with various mixtures, all being General Motors buses powered by diesel engines. In the tests which follow, each bus was examined by air polution experts for obnoxious odors and for eye irritation. These evaluations were made by driving in an automobile behind an operating bus, with the heater blowers of the automobile in full operation. The automobile heating system sucked in the exhaust fumes, for testing by personnel within the automobile.

In each case, the material to be tested was charged into a container, and the material was injected into the exhaust in substantially the manner shown in the drawing hereof. The air pressure for this operation was derived directly from the engine and varied from 5–12 pounds. The openings of the tubes were placed in such a manner that the pressure of the engine exhaust tended to apply suction or to give a venturi action to the material injected.

Example 12

A blend was prepared consisting essentially by weight of about 55% water, 10% perfume oil and 45% quaternary ammonium chloride. The reduction of eye irritation and obnoxious odor was very pronounced and the exhaust products had a very pleasant odor. Without the quaternary ammonium chloride, a similar mixture containing water, perfume and emulsifier had no effect on the smell of the exhaust, which was obnoxious and irritating to the eyes.

Example 13

The foregoing test was repeated with the exception that an equal quantity of ethylene glycol was added in place of the quaternary ammonium chloride. No appreciable difference in the characteristics of the exhaust was discernible. But, when the quaternary compound was added in equal quantity in addition to the glycol, very satisfactory results were obtained.

Example 14

Further tests were conducted under the conditions referred to in the foregoing examples. The perfume oil and quaternary compound were emulsified in Stoddard solvent, and placed into the dispenser. The bus was operated at all speeds with unsatisfactory results. The exhaust was irritating to the eyes and had an objectionable odor. It is apparent that water is needed in the system. When similar tests were conducted, substituting water for Stoddard solvent, the results were extremely good.

Example 15

Utilizing a procedure as in the foregoing example, ammonium chloride in dry form was charged into the dispenser, pressure up to 18 pounds per square inch was applied in the air line, and air was forced through the ammonium chloride and into the exhaust pipes. It was difficult to ascertain the effect, if any. Then one pint of water was added, resulting in a strong ammoniacal odor. However, when a 10% solution of quaternary ammonium chloride was added, a noticeable reduction of eye irritation was noted although the ammoniacal odor from the ammonium chloride persisted.

Example 16

Following the foregoing procedure, an aqueous solution of formaldehyde was placed into the dispenser and the engine run at various speeds. No noticeable effects were produced.

Example 17

Following the foregoing procedure, a sample of dry powdered quaternary ammonium chloride compound was discharged into the dispenser and air was forced through it. No results or noticeable effects were obtained. Then one pint of water was added with very excellent results as to eye irritation suppression.

Example 18

Samples of vanillin and then cumarin were dissolved and charged into the dispenser. There was no appreciable effect on the exhaust until a portion of quaternary ammonium compound was added.

Example 19

A system was installed in a diesel powered city bus including a dispenser for a composition comprising a paste composed of perfume oil, emulsifier, and quaternary ammonium chloride which was charged into the dispenser. A water line direct from the radiator overflow tank of the engine was connected through a drip valve and then to the dispenser. As the engine was operated, water dripped into the dispenser, but the water flow was not constant and the product turned into a heavy paste which blocked the air flow and consequently the air stream was unable to absorb a workable amount of chemical compound. When the same material was utilized as an aqueous liquid, optimum results were obtained.

From the foregoing examples, it will be appreciated that a wide variety of quaternary compounds in widely varying proportions may be utilized in accordance with this invention. The essential feature is to inject the compound into the exhaust gas of the gasoline or diesel engine, and to permit sufficient time and to cause sufficient turbulence to cause an intimate admixture of the reacting compounds.

Although this invention has been described with reference to specific forms of apparatus and to specific compounds and compositions, it will be appreciated that equivalent substances and materials may be utilized without departing from the spirit or scope of this invention. Moreover, certain features of the invention may be used independently of other features, and additional compounds may be incorporated provided they do not adversely affect the operation of the quaternary ammonium compound. All such modifications are intended to be included within the scope of this invention as defined in the appended claims.

Having thus described my invention, I claim:

1. In a method of treating exhaust gases of an internal combustion engine, the novel step which comprises intimately admixing said exhaust gases with a quaternary ammonium salt in the presence of moisture.

2. In a method of treating exhaust gases of an internal combustion engine, the novel step which comprises intimately admixing said exhaust gases with an aqueous solution of an ionic quaternary ammonium salt.

3. In a method of denaturing exhaust gases of an internal combustion engine, the novel steps which comprise intimately admixing an ionic quaternary ammonium salt with an inert gas under pressure, and forcing the resulting mixture under pressure and in the presence of moisture into a moving stream of said exhaust gases.

4. In a method of denaturing exhaust gases of an internal combustion engine, the novel steps which comprise forming a dilute aqueous solution of a quaternary ammonium salt, passing a stream of air under pressure into contact with said aqueous solution, entraining said solution in said air stream, and intimately admixing said exhaust gases with said air stream containing said aqueous solution by passing them together at a turbulent velocity along an elongated path of restricted area.

5. The method defined in claim 4, wherein the quaternary ammonium salt is emulsified with a perfume oil in said aqueous solution.

6. In a method of denaturing exhaust gases of an internal combustion engine, the novel step which comprises intimately admixing said exhaust gases with an aqueous solution of alkyldimethylbenzyl ammonium halide.

7. In a method of denaturing exhaust gases of an internal combustion engine, the novel step which comprises intimately admixing said exhaust gases with an aqueous solution of alkyldimethyl 3:4 dichlorobenzylammonium halide.

8. In a method of denaturing exhaust gases of an internal combustion engine, the novel step which comprises intimately admixing said exhaust gases with an aqueous solution of cetyl pyridinium halide.

9. In a method of denaturing exhaust gases of an internal combustion engine, the novel step which comprises intimately admixing said exhaust gases with an aqueous solution of lauryl isoquinolinium halide.

10. In a method of denaturing exhaust gases of an internal combustion engine, the novel step which comprises intimately admixing said exhaust gases with an aqueous solution of stearyldimethylbenzylammonium chloride.

References Cited in the file of this patent

UNITED STATES PATENTS

| | | |
|---|---|---|
| 1,421,432 | Embanks | July 4, 1922 |
| 1,566,332 | Lilly | Dec. 22, 1925 |
| 2,541,248 | Hibbs | Feb. 13, 1951 |